(No Model.)
S. D. GIFFORD.
SHOVEL PLOW AND CULTIVATOR.
No. 420,994. Patented Feb. 11, 1890.
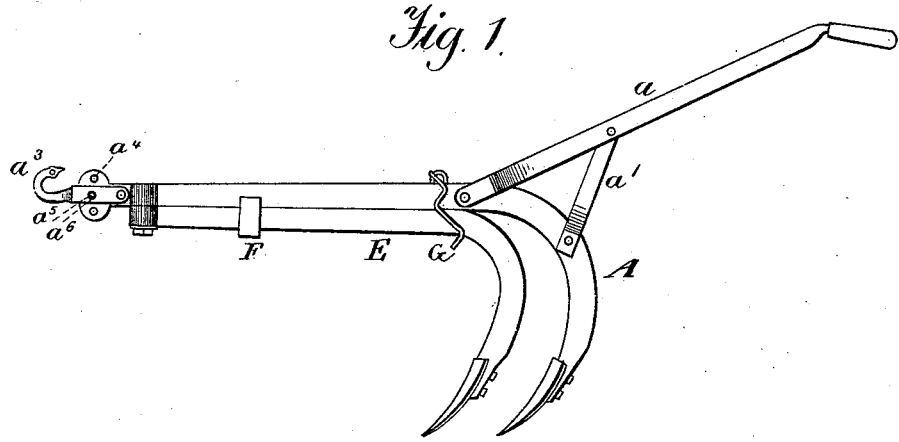
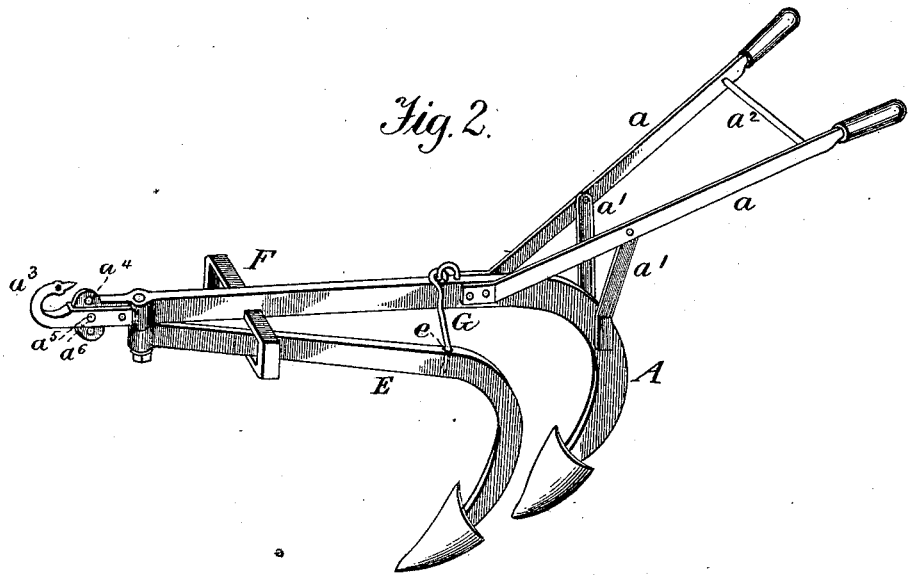
WITNESSES:
A. Ruppert
H. A. Daniels
INVENTOR
Squire D. Gifford
BY Thomas P. Simpson
ATTORNEY.

UNITED STATES PATENT OFFICE.

SQUIRE DANIEL GIFFORD, OF WALLACE, WEST VIRGINIA.

SHOVEL PLOW AND CULTIVATOR.

SPECIFICATION forming part of Letters Patent No. 420,994, dated February 11, 1890.

Application filed October 21, 1889. Serial No. 327,698. (No model.)

*To all whom it may concern:*

Be it known that I, SQUIRE DANIEL GIFFORD, a citizen of the United States, residing at Wallace, in the county of Harrison and State of West Virginia, have invented certain new and useful Improvements in Shovel Plows and Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of my invention is to make a shovel plow or cultivator with two beams, one of which shall be adjustable under or to either side of the other, as hereinafter fully described.

Figure 1 of the drawings is a side elevation showing my invention as a single-shovel plow, one of the shovels being behind the other; and Fig. 2, an elevation in perspective, showing it as an echelon or double-shovel plow.

In the drawings, A represents the long and E the short beam, both curved at the rear to form a standard for the shovel or other plow-iron. The beam A has handles $a\,a$, supported by the braces $a'\,a'$ and spaced by the rod $a^2$; also, the front adjustable draft-hook $a^3$ and holes $a^4$, the hook being held at different points of adjustment by a stop-pin $a^5$, passed through a hole $a^6$ and one of the holes $a^4$.

E is the short beam, which is pivoted at its front end under and to the long beam A. This enables beam E to occupy three different positions—namely, one directly under beam A to bring the plow-irons in line with one another, and one to each side of beam A to form a right or left hand plow or cultivator, which is very desirable on hilly land.

The beam E is gaged, guided, and supported by the rectangular loop F, which is fast to the under side of the beam A, and extends an equal distance on each side thereof. This is not absolutely necessary, but is nevertheless desirable. On top of the beam E is a hole $e'$, into which works the bent end of the latch G, which is pivoted to the top of beam A. By this arrangement of devices the beam is fixed in position after it has been adjusted, and its plow operates with great uniformity.

It will thus be seen that my invention can be used as a single or double shovel or as a side-hill plow or cultivator. For the latter purpose it is a great convenience, and also to plow corn or other crop by running close to the plants without striking them with the handles.

Of course the curved ends of the beams A E may be made to receive a plow iron or tooth of any desired shape without departing from the principle of my invention.

Having thus described all that is necessary to a full understanding of my invention, what I claim as new, and desire to protect by Letters Patent, is—

The combination, with the fixed beam A and pivoted beam E, adapted to swing to either side, of the cross-loop F, fast on the under side of beam A and extending on both sides thereof, and the latch or hook G, as and for the purpose specified.

In testimony whereof I affix my signature in presence of two witnesses.

SQUIRE DANIEL GIFFORD.

Witnesses:
JOHN R. NESBITT,
ARRIZANA NESBITT.